No. 728,170. PATENTED MAY 12, 1903.
C. A. JOERISSEN.
TABULATING MECHANISM FOR TYPE WRITING MACHINES.
APPLICATION FILED NOV. 11, 1902.
NO MODEL. 5 SHEETS—SHEET 4.

Witnesses
H. G. Dieterich
H. H. Simmons

Inventor
Carl A. Joerissen
By Knight Bros
Attorneys

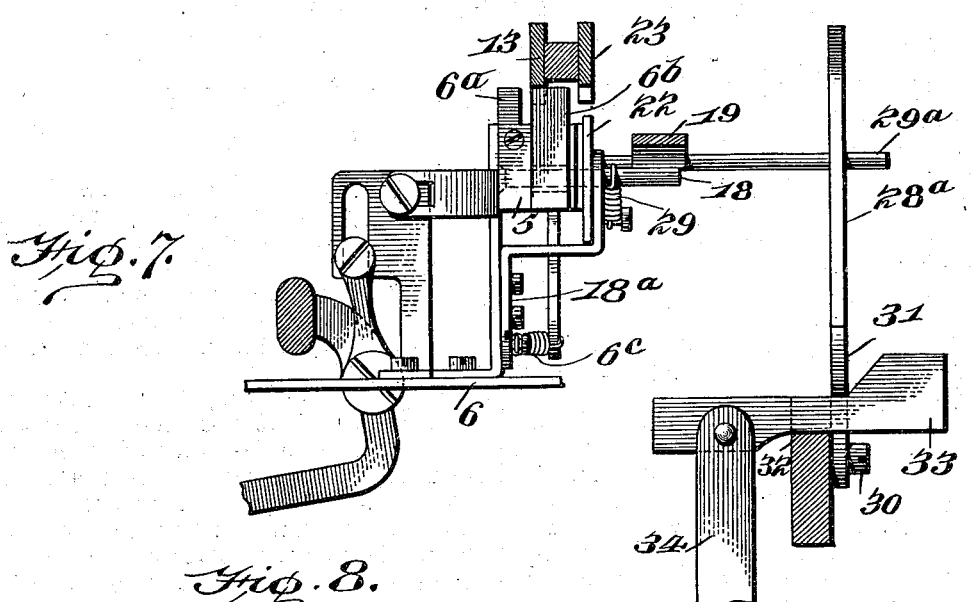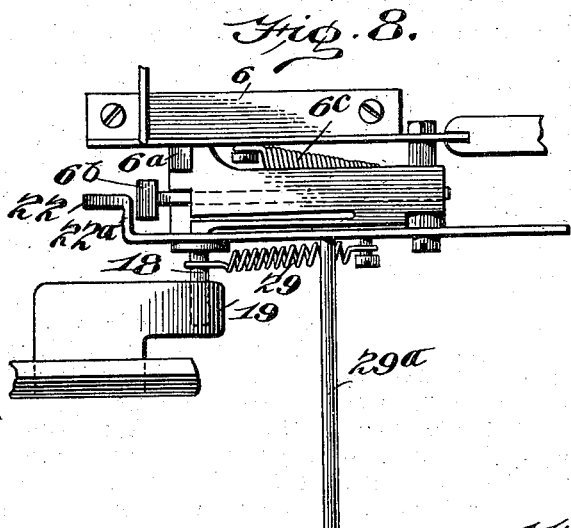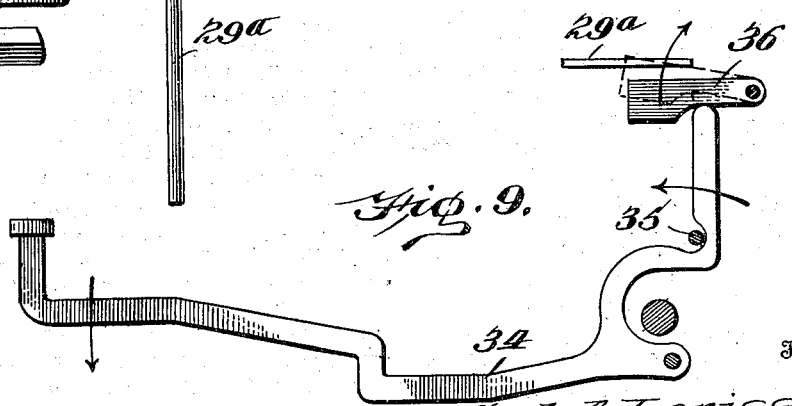

No. 728,170. Patented May 12, 1903.

UNITED STATES PATENT OFFICE.

CARL A. JOERISSEN, OF PHILADELPHIA, PENNSYLVANIA.

TABULATING MECHANISM FOR TYPE-WRITING MACHINES.

SPECIFICATION forming part of Letters Patent No. 728,170, dated May 12, 1903.

Application filed November 11, 1902. Serial No. 130,918. (No model.)

*To all whom it may concern:*

Be it known that I, CARL A. JOERISSEN, a citizen of the United States, and a resident of Philadelphia, Pennsylvania, (whose post-office address is 718 Chestnut street, in said city,) have invented certain new and useful Improvements in Tabulating Mechanism for Type-Writing Machines, of which the following is a specification.

This invention relates to tabulating mechanism for type-writing machines; and the object thereof is to provide means for giving the carriage, when released, a preliminary stop and determining the distance the carriage shall go after the said preliminary stop.

A further object is to provide means for holding the carriage-dog out of engagement until the carriage has moved a certain distance, when said means automatically releases the dog and it is thrown automatically into engagement again.

Other objects and advantages will appear in the following description, and the novel features will be particularly pointed out in the claims.

Figure 1:
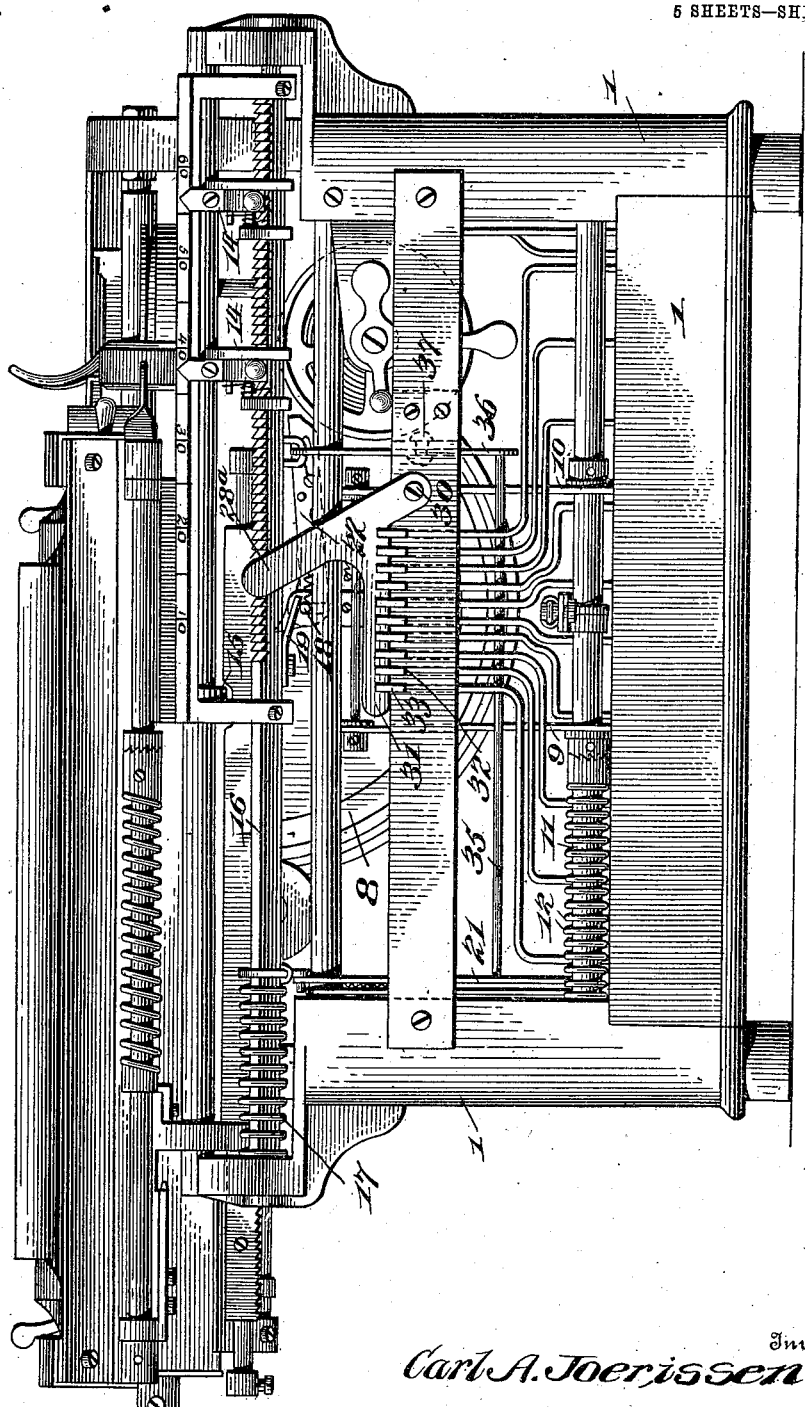
Figure 2:
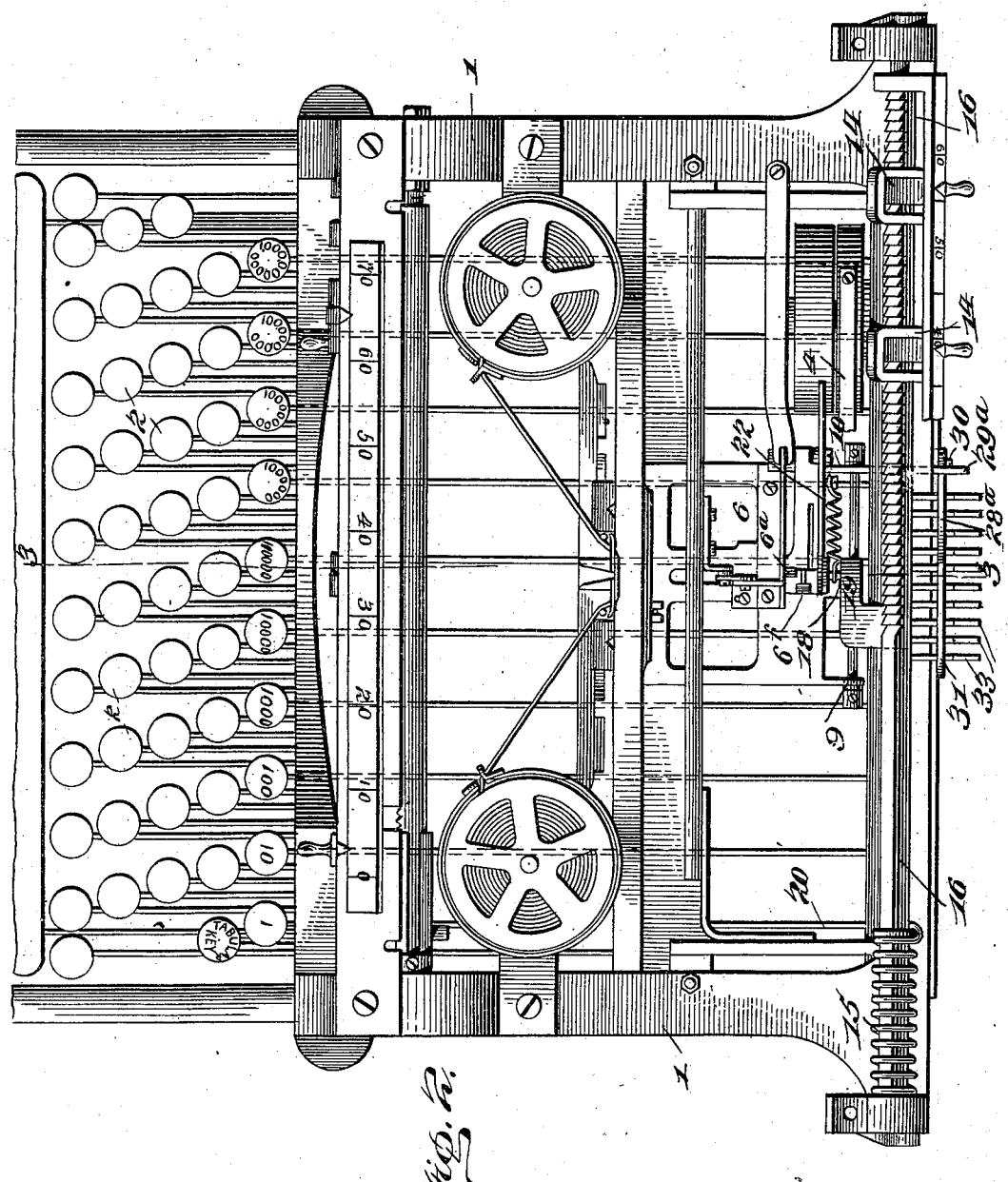
Figure 3:
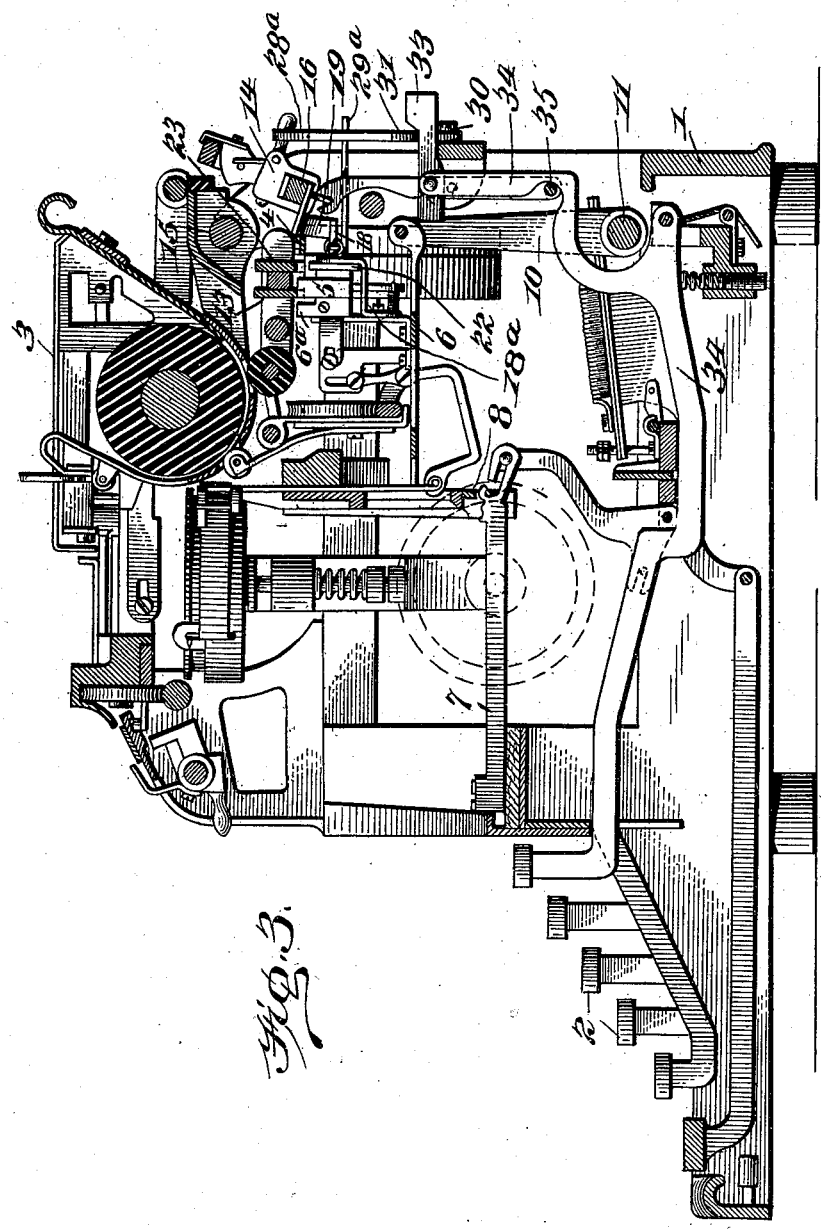
Figure 4:
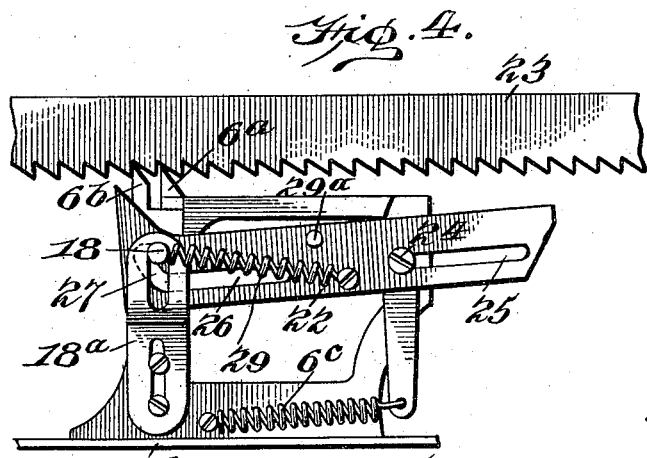
Figure 5:
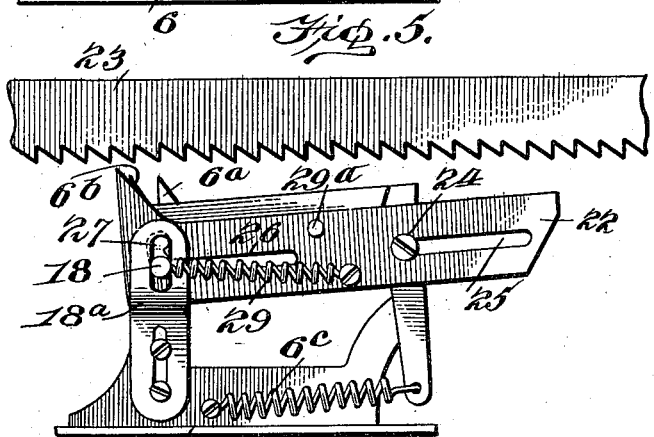
Figure 6:
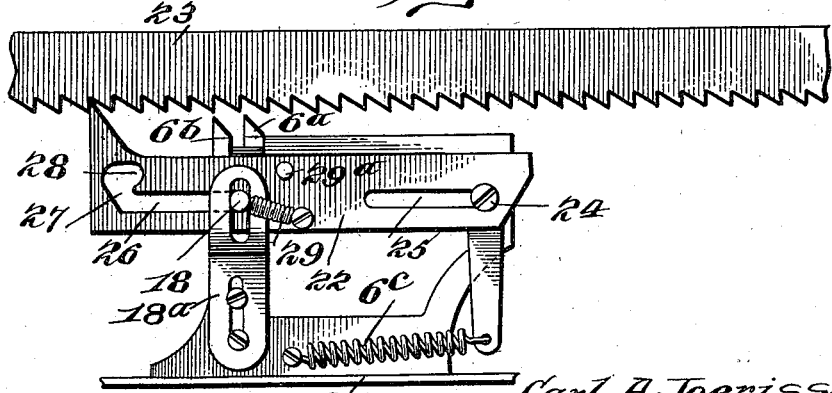

In the drawings forming a part of this specification, Figure 1 is a rear elevation of an "Underwood" type-writer equipped with my invention. Fig. 2 is a top plan view of the said type-writer and my attachment thereon, the carriage being removed. Fig. 3 is a sectional view taken on the line 3 3, Fig. 2, with the cariage in position. Fig. 4 is a detail side elevation of my invention before the ordinary carriage-dog is depressed. Fig. 5 is a side elevation of the same in which the carriage-dog is depressed and the supplemental dog is in a position to be thrown forward. Fig. 6 is a side elevation of the same in which the supplemental dog is shown in engagement with the rack, while the carriage-dog is depressed. Fig. 7 is a detail section of parts of the machine, showing an end view of my invention. Fig. 8 is a top plan view of a modification, in which one instead of two racks on the carriage is employed; and Fig. 9 is a side elevation of a modification of the stop mechanism.

While I have shown my invention applied to an Underwood machine, it is to be understood that the same is adapted for use on any make of machine, it being of course necessary when applying it to others to make slight changes, which will be within the skill of any mechanic familiar with this class of machines.

While the objects hereinbefore mentioned may be accomplished in various ways, I herein show and describe my present preferred construction.

For an understanding of my invention when applied to an Underwood machine it will be necessary to describe generally some of the parts employed in said machine, and, referring to the drawings, 1 designates the frame carrying the ordinary key-levers 2, and 3 designates the carriage. The carriage 3 is moved across the frame 1 by means of the spring-drawn tape 4 and is controlled by the dog 5, comprising a fixed pawl $6^a$ and a movable pawl $6^b$, controlled by a spring $6^c$ and mounted upon a dog-carrying frame 6, which is shifted in one direction by means of the type-bars 7, which contact with the segment or universal bar 8, secured to the frame 6. The dog-carrying frame is swung by means of two arms 9 and 10 from an oscillating shaft 11, surrounded by a spring 12.

When the key-lever is depressed, the type-bar contacting with the segment or universal bar 8 shifts the dog-carrying frame 6 in one direction, thereby throwing the fixed pawl $6^a$ into engagement with a rack 13, secured upon the carriage, and throwing the movable pawl $6^b$ out of engagement with said rack. The movable pawl then advances a tooth of the rack by means of the spring $6^c$, and the spring 12 on the oscillating shaft 11 then shifts the dog-carrying frame in the other direction. Consequently the movable pawl is moved into engagement with the rack-bar and the fixed pawl out of engagement with said bar. The spring-held tape 4 then advances the carriage to the limit of the movement of the movable pawl. The above matter refers to the construction of the ordinary letter-spacing mechanism of the Underwood machine.

The tabulating mechanism now employed in the Underwood machine comprises a number of adjustable stops 14, adapted to be thrown into the path of the carriage and to be engaged by a fixed stop 15 thereon. The adjustable stops 14 are mounted on a bar 16, controlled by a spring 17. In order to release the carriage when one of the stops 14 is thrown into its path, the movable pawls 6ª and 6ᵇ are pivotally mounted upon the dog-carrying frame 6 and are provided with a stud 18, which is guided in a double L-shaped slotted bracket 18ª on the dog-carrying frame. This stud 18 is engaged by an arm 19 on the bar 16, so that when the bar 16 is moved to throw one of the stops 14 into the path of the carriage the pawls 6ª and 6ᵇ are depressed out of the path of the rack 13 and the carriage moves forward until it strikes one of the stops 14. The stops 14 are moved into the path of the carriage by means of a key-lever 20, connected to one end of a double-armed lever 21, which is connected at its other end to the bar 16. So long as the key-lever 20 is depressed the stops 14 will be in the path of the carriage and the pawls 6ª and 6ᵇ will be depressed; but when pressure is taken off of the key-lever 20 the stops are thrown out of the path of the carriage by the spring 17 and the spring 6ᶜ throws the pawl 6ᵇ into engagement with the rack 13.

It is my purpose to utilize the above-described tabulating mechanism with my invention, whereby the carriage may be moved any number of spaces after it has been stopped by one of the stops 14. This is accomplished by a device which holds the dog 5 out of engagement with the rack 13 until the carriage has moved the desired predetermined distance. This device comprises a supplemental dog 22, adapted for engagement with the rack 13 or with a supplemental rack 23. This supplemental dog is normally out of the path of the rack and is guided upon the stud 24 and the stud 18 by a straight slot 25 and a slot 26, said slot 26 having an upward and forward extension 27, which is provided with a rearwardly-extending portion 28. When dog 5 is depressed, the supplemental dog 22, being mounted at one end on the stud 18, is carried down with it until the said supplemental dog strikes one of the arms of the bracket 20, which forms a stop therefor, and the stud 18, being rigid with the dog 5, moves farther downwardly until the slot 26 in the supplemental dog is reached, when the spring 29 moves the supplemental dog 22 forward. The tooth of the dog 22 when the stud 18 is in the slot 26 is in a higher plane than the tooth of the dog 5. It follows, therefore, that when the stud 18 is released from the arm 19 the supplemental dog 22 will engage the rack before the dog 5 and hold the said dog 5 out of engagement. The carriage having nothing to hold it against movement carries the supplemental dog 22 with it until the upward extension 27 reaches the stud 18, when the spring 6ᶜ throws the stud 18 into said extension, thereby lowering the supplemental dog 22 and throwing the dog 5 into engagement with the rack. It follows from the above that if the supplemental dog 22 has means for varying its throw when released the movement of the carriage, which travels with it on its return, will also be varied, and consequently a varied letter-spacing will be obtained. I may provide numerous means for accomplishing this result; but the present preferred construction consists of a single stop 28ª, which is thrown to various positions in the path of an extension 29ª on the supplemental dog 22. This stop 28ª is pivoted at 30 to the frame of the machine and is provided with an arm 31 at an angle thereto. On the frame adjacent to said arm is provided a series of notches 32, in which move slide-cams 33, operated by key-levers 34, which are connected to the same. The slide-cams bearing against the arm 31 at different distances from the pivot of the stop 28ª necessarily throw the stop a greater or less distance, according to their distance from the said pivot.

The key-levers 34 when depressed not only move the stop 28ª to a certain position, but they depress the dog 5 by engaging with a universal bar 35, which is connected at one end to the double-arm lever 21 and to another double-arm lever 36, pivoted at 37 and connected at its other end, as is the lever 21, with the bar 16.

In Fig. 8 I have shown a modification wherein I employ only one rack, the supplemental dog being deflected at 22ª in advance of the pawl 6ᵇ, so that their teeth will be in alinement.

In Fig. 9 I show a modified form of the means for stopping the supplemental dog. Instead of a single stop a plurality of stops 38 is employed. Each stop 38 is pivoted to the frame and has a cam-face on the under side, against which the upper end of the key-lever 34 bears to throw the stop into the path of the extension 29ª.

The operation of the machine is as follows: One of the key-levers 34 is depressed—say the unit-key. Thereupon the cam 33 is moved to raise the arm 31, which, being nearest to the end of said arm, only moves the stop 28ª a short distance. Simultaneously the key-lever bears against the universal bar 35, upon movement of which one of the stops 14 is thrown in the path of the fixed stop 15 of the carriage and the arm 19 depresses the stud 18, whereby the dog 5 is thrown out of engagement with the rack 13, releasing the carriage. The dog 22 is locked in its lowermost position by means of the stud 18 engaging with the rearward extension 28 of the slot 26. When the dog 5 is depressed, the stud 18, being secured thereto, is also depressed, whereby it is moved into the upward extension 27, thus removing all obstruction to the forward movement of the dog 22 under the influence of the spring 29, which forces the said dog 22 forward, the stud 18 sliding into the main slot 26, its forward movement being limited by the stop 28ª, which is thrown in various positions, according to the key operated, in the path of the extension 29ª on the dog 22. The carriage-stop 15 has by this time reached the stop 14, and the key-lever 34 is released, thereby releasing the stud 18, when the dogs 5 and 22 are raised by the spring 6ᶜ. The tooth of the dog 22 in this position being in a higher plane than that of the dog 5 reaches the carriage first and holds the dog 5 out of engagement by reason of the stud 18 being in the main slot 26. The dog 22, however, is now moved by the continued movement of the carriage, after the preliminary stop, until the upward extension 27 is in a position over the stud 18, when the dog 22 is lowered relatively to the dog 5, the stud 18 entering the extension 27 and being locked in the extension 28 by means of the spring 6ᶜ, which raises the dog 5, which now engages the carriage.

Having thus described my invention, the following is what I claim as new therein and desire to secure by Letters Patent:

1. In a tabulating mechanism for type-writing machines, the combination with the carriage, of means for preliminarily stopping the carriage, when released, means engaging the carriage while preliminarily stopped, and yielding to permit the carriage to move a predetermined number of spaces beyond the preliminary stop, and means for determining the number of spaces which the carriage is permitted to move by the yielding means.

2. In a tabulating attachment for type-writing machines, the combination with the carriage and the dog for controlling it, of means for throwing the dog out of engagement, means for giving the carriage a preliminary stop, means for holding the dog out of engagement until the carriage has moved a certain predetermined distance beyond said preliminary stop when said means automatically releases the dog.

3. In a tabulating mechanism for type-writing machines, the combination with the carriage and the dog for controlling it, of means for throwing the dog out of engagement, means for giving the carriage a preliminary stop, and means thrown into engagement when the dog is released permitting the carriage to move a predetermined distance beyond said preliminary stop, before the dog is allowed to be thrown again into engagement.

4. In a tabulating mechanism for type-writing machines, the combination with the carriage and the dog for controlling it, of means for throwing the dog out of engagement, means for giving the carriage a preliminary stop, means adapted to be thrown into engagement when the dog is out of engagement and moving with the carriage a predetermined distance beyond said preliminary stop and thrown automatically out of engagement when the limit of its movement is reached.

5. In a tabulating mechanism for type-writing machines, the combination with the carriage and the dog for controlling it, of a means for throwing the dog out of engagement, means for giving the carriage a preliminary stop, a device thrown into engagement when the dog which controls the carriage is out of engagement, holding said dog out of engagement and movable with the carriage a predetermined distance beyond said preliminary stop, releasing said carriage-controlling dog at the end of its movement.

6. In a tabulating mechanism for type-writing machines, the combination with the carriage and the dog for controlling it, of a supplemental dog movable relatively to the carriage-controlling dog, means for moving said supplemental dog automatically when the carriage-controlling dog is out of engagement, and means for varying the movement of the supplemental dog.

7. In a tabulating mechanism for type-writing machines, the combination with the carriage and the dog for controlling it, of means for throwing the carriage-controlling dog out of engagement, a supplemental dog, means moving said supplemental dog relatively to the carriage-controlling dog, means throwing the supplemental dog into engagement when the carriage-controlling dog is released by the means which threw said carriage-controlling dog out of engagement, and means holding said carriage-controlling dog out of engagement until the supplemental dog has reached the limit of its return movement.

8. In a tabulating mechanism for type-writing machines, the combination with the carriage and the dog for controlling it, of means for throwing the carriage-controlling dog out of engagement, a supplemental dog, means moving said supplemental dog automatically, relatively to the carriage-controlling dog when the said carriage-controlling dog is thrown out of engagement, means for determining the distance the supplemental dog is to move, means throwing the supplemental dog into engagement when the carriage-controlling dog is released by the means which threw said carriage-controlling dog out of engagement, and means holding said carriage-controlling dog out of engagement until the supplemental dog has reached the limit of its return movement.

9. In a tabulating mechanism for type-writing machines, the combination with the carriage and the dog controlling it, of a stud carried by the carriage-controlling dog, a supplemental dog carried by the carriage-controlling dog and provided with a slot in which the stud works to throw the supplemental dog in a plane above the carriage-controlling dog, and having a locking portion, means for throwing the carriage-controlling dog out of engagement, means in the path of the supplemental dog moving the stud out of the locking portion of the slot, and a spring for automatically moving the supplemental dog when the stud is forced out of the locking portion of the slot.

10. In a tabulating mechanism for type-writing machines, the combination with the carriage and the dog controlling it, of a stud carried by the carriage-controlling dog, a supplemental dog carried by the carriage-controlling dog and provided with a slot in which the stud works to throw the supplemental dog in a plane above the carriage-controlling dog, and having a locking portion, means for throwing the carriage-controlling dog out of engagement, means in the path of the supplemental dog moving the stud out of the locking portion of the slot, a spring for automatically moving the supplemental dog when the stud is forced out of the locking portion of the slot, and a stop for limiting the movement of the supplemental dog to determine the length of its movement.

11. The combination with a tabulating-stop for type-writing machines moved into the path of, and engaging the carriage as the spacing-dogs are released, a supplemental dog moved into the path of and engaging the carriage when the carriage is arrested by the tabulating-stop and yielding and permitting the carriage to move to a predetermined point after the tabulating-stop is released.

12. The combination with a tabulating-stop for type-writing machines moved into the path of, and engaging the carriage as the spacing-dogs are released, a supplemental dog moved into the path of and engaging the carriage when the carriage is arrested by the tabulating-stop and yielding and permitting the carriage to move to a predetermined point after the tabulating-stop is released; and means for predetermining the distance of the yielding movement of the supplemental dog.

13. The combination with a tabulating-stop for type-writing machines moved into the path of, and engaging the carriage as the spacing-dogs are released, a supplemental dog moved into the path of and engaging the carriage when the carriage is arrested by the tabulating-stop and yielding and permitting the carriage to move to a predetermined point after the tabulating-stop is released; and tabulating key-levers respectively predetermining different distances to which the supplemental dog shall yield.

14. In combination with a carriage and its controlling-dog, means for releasing the carriage, a stop arresting the carriage approximately at the position to which it is to be adjusted, a supplemental dog moving into engagement with the carriage when released, and yielding to permit a limited movement of the carriage beyond the approximate position established by the stop, and means for predetermining the distance of the yielding movement of the supplemental dog.

15. In combination with a carriage and its controlling-dog, means for releasing the carriage, a plurality of stops arresting the carriage approximately at different positions to which it is to be adjusted, a supplemental dog moving into engagement with the carriage when released by any of said stops, and yielding to permit a limited movement of the carriage beyond the approximate position determined by any of said stops, and means for predetermining the distance of the yielding movement of the supplemental dog.

16. The combination with the carriage and a dog for controlling it, of a device movable with the dog and relatively thereto, means locking the device and dog together, means moving the dog out of engagement, means unlocking the device from the dog when the dog is out of engagement, means moving the device relatively to the dog so that it will engage the carriage before the dog and hold the dog out of engagement, said device being moved by the carriage back to its locked position, and releasing the dog.

17. In a tabulating mechanism for type-writing machines, the combination with the carriage and the dog controlling it, of a stud 18 and a stud 24 carried by said dog, a supplemental dog 22 provided with slot 25 in which the stud 24 works, and the slot 26 having the extensions 27 and 28 in which the stud 18 works, a slotted bracket 18$^a$ forming a stop for the supplemental dog to unlock the same, and a spring 29 for moving the supplemental dog, substantially as shown and described.

18. In a tabulating attachment for type-writing machines, the combination with a supplemental dog limiting the movement of the carriage, a pivoted stop determining the throw of said supplemental dog, and means engaging the stop at different distances from its pivot-point to give it a varied throw.

19. In a tabulating mechanism for type-writing machines, the combination of the supplemental dog, a pivoted stop determining the throw of said supplemental dog, and sliding cams engaging the stop at different distances from its pivot-point to predetermine its position.

20. In a tabulating mechanism for type-writing machines, the combinaton of the supplemental dog, the pivoted stop, having an arm at an angle thereto, sliding cams engaging the arm of the stop at different distances from the pivot of the stop, and key-levers connected to the cams.

The foregoing specification signed this 8th day of November, 1902.

CARL A. JOERISSEN.

In presence of—
DAVID GOODBREAD,
J. JOSEPH STRATTON.